Feb. 18, 1958
C. M. L. L. BOURCIER DE CARBON
2,823,915
SHOCK ABSORBERS
Filed May 7, 1954
2 Sheets-Sheet 1
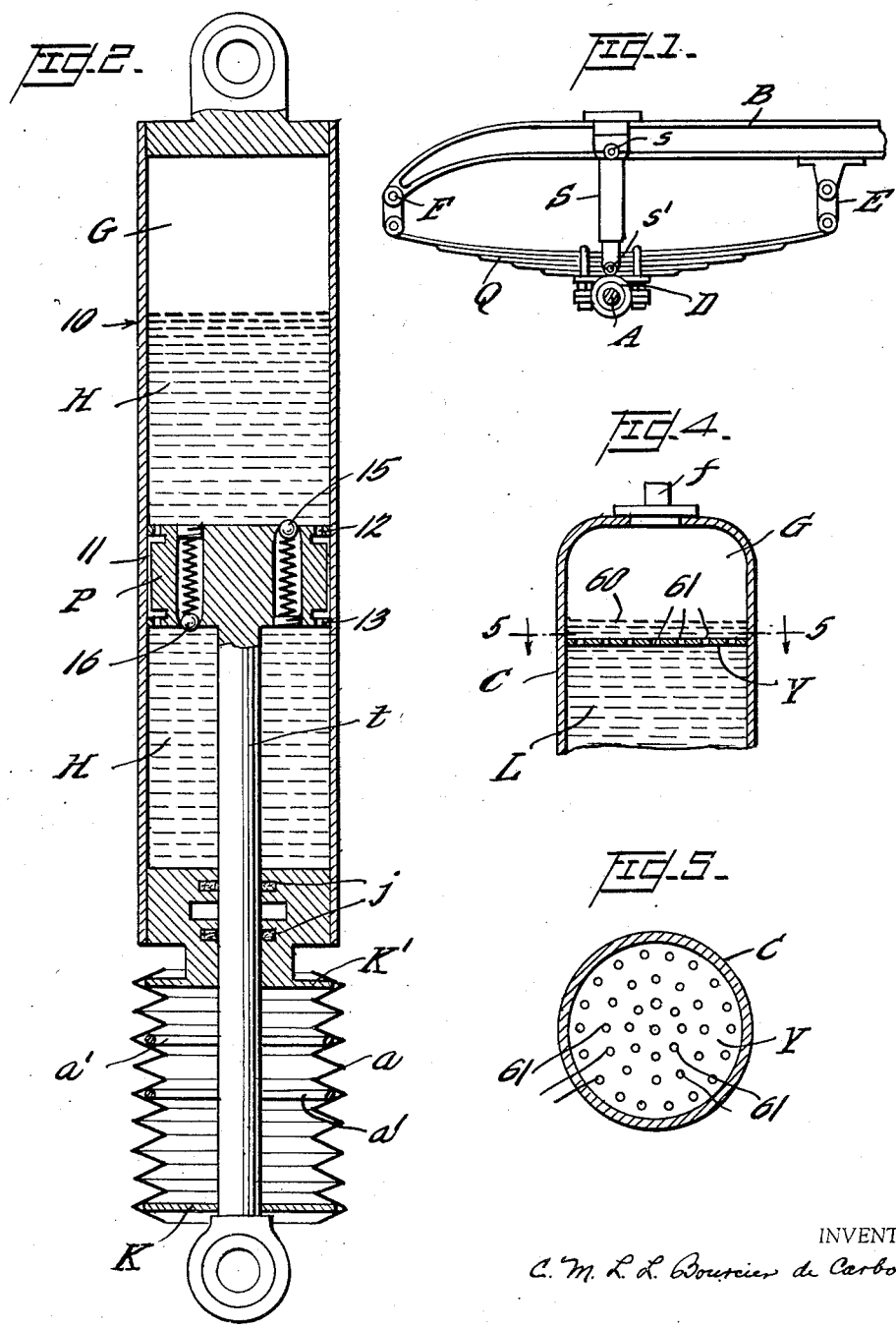
INVENTOR
C. M. L. L. Bourcier de Carbon
BY Watson, Cole, Grindle & Watson
ATTORNEYS

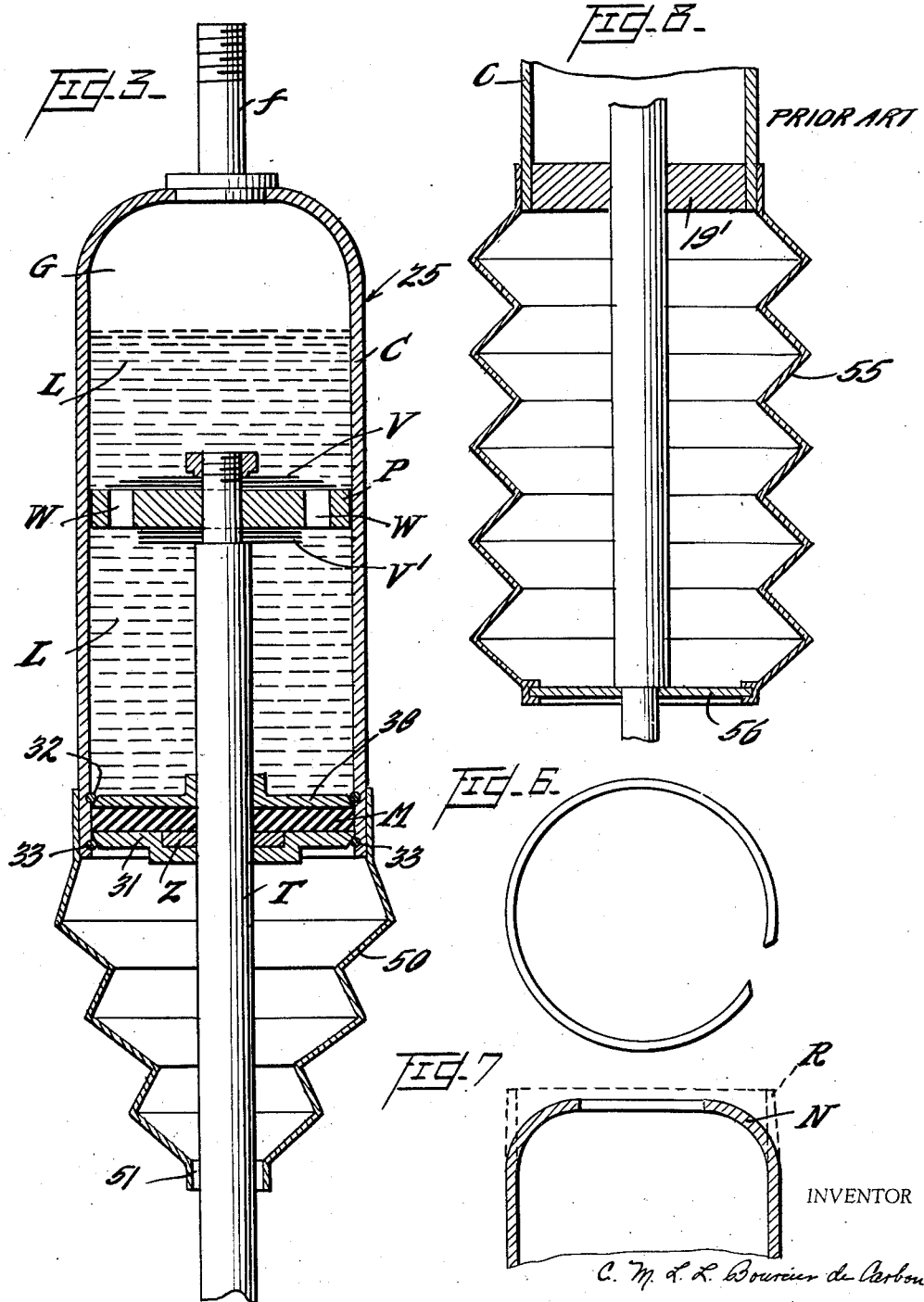

United States Patent Office 2,823,915
Patented Feb. 18, 1958

2,823,915
SHOCK ABSORBERS

Christian Marie Lucien Louis Bourcier de Carbon,
Neuilly-sur-Seine, France

Application May 7, 1954, Serial No. 428,298

Claims priority, application France May 21, 1953

4 Claims. (Cl. 267—8)

The present invention relates to shock absorbers containing a liquid and a compressed gas and has for its general object the provision of a method and a technique of construction and inflation of a hydraulic shock absorber using a gas at a pressure which is materially above atmospheric pressure, the said shock absorber being of the telescopic type, that is to say being constituted essentially by a working cylinder within which slides a piston immersed in a liquid and carried by a co-axial rod, which passes through the lower end of the cylinder which, consequently, is provided with a sealing joint. The preferred forms of the piston and of the joint will be described below.

This application is a continuation-in-part of my co-pending application Serial No. 99,796, filed June 17, 1949, and now Patent 2,721,074, granted October 18, 1955, and is related to my co-pending application Ser. No. 314,714, filed October 14, 1952, and now Patent 2,774,446, granted December 18, 1956.

The subject matter of this invention relates to shock absorbers per se, which are designed to damp or cushion the relative movement of two parts, for example the chassis and the wheel mounting of a motor vehicle, and not to furnish the entire spring support for the chassis, this latter function being substantially totally satisfied by the ordinary springing of the vehicle. Thus, although certain of the embodiments of the invention might have a superficial resemblance to some of the oleo struts adapted to perform the supporting function in an airplane landing gear, the present invention has for its object the provision of a shock absorber functioning quite differently from such resilient supporting devices.

The present invention, in its more specific aspects, contemplates the provision of a device which is absolutely gas-tight and has no inflation valve, the inflation of the device being obtained simply by the introduction into the device, before it is finally closed, of a substance which is gaseous under normal conditions of temperature but which is introduced at a very low temperature in the liquid or solid form in which it can be easily handled.

The device is then finally closed, preferably, but not necessarily, by fixing in position the sealing joint which is used to allow the rod of the piston to slide and to pass out of the working cylinder without leakage of gas. By slow heating and by the evaporation which results therefrom, the device is then filled with a gas which is compressed to a high pressure and becomes ready for use.

A modification of the invention consists in the use of a gas which is evolved within the device, after it has been closed, by a suitable chemical reaction between substances previously introduced in the liquid or solid form.

This method of construction and of inflation has a double advantage; on the one hand, an economy arising out of an obvious reduction in the manufacturing cost as a result of the elimination of the inflation valve; on the other hand, a technical advantage resulting from greater reliability in operation, because leakages which can always take place and which are difficult to eradicate with certainty when an inflating valve is used are obviously eliminated by the elimination of the inflation valve itself.

The gas under pressure may be separated from the liquid contained in the shock absorber either by a free piston or by a deformable partition, but in a preferred form of the invention the gas and the liquid may be in contact with each other.

It is preferred to use nitrogen gas since it has been found to give somewhat better results than the suggested used of carbon dioxide gas. The nitrogen is preferably injected into the cylinder during assembly of the shock absorber and of course before the piston rod packing is sealed. The nitrogen is preferably injected in the form of the liquefied gas and then after sealing the piston rod packing, the nitrogen will resume its gaseous phase and provide the volume of gas under very high pressure within the shock absorber.

However, whatever the life of such a device may be, the sealing joint can only have a limited life. It finally becomes fatigued and the quantity of oil contained in the shock absorber slowly diminishes as a result of imperceptible wastage and during operation, passes out of the device by molecular adhesion to the rod of the piston. An important problem is thus raised: that of recharging the shock absorber with oil and with gas and of changing the sealing joint.

Other objects and features of novelty will be apparent from the following specification when read in connection with the accompanying drawings in which certain embodiments of the invention are illustrated by way of example.

In the drawings:

Figure 1 is a purely diagrammatic showing of one of many possible installations of my novel shock absorber in an automotive vehicle;

Figure 2 is a vertical sectional view in somewhat diagrammatic form of a gas pressure hydraulic shock absorber according to my above mentioned Patent No. 2,721,074;

Figure 3 is a similar view of another embodiment of the invention;

Figure 4 is a fragmentary vertical sectional view corresponding to the upper portion of Figure 2 and showing a variation in construction within the scope of the present invention;

Figure 5 is a horizontal sectional view taken on line 5—5 of Figure 4;

Figure 6 is a plan view of one of the locking rings employed in the piston rod seal;

Figure 7 is a diagrammatic fragmentary view of the upper portion of the cylinder of the shock absorber shown in Figure 3, indicating one method of shaping the device; and Figure 8 is a vertical sectional view illustrating a conventional bellows shield constituting an example of the prior art.

In the diagram of Figure 1 a wheel supported axle A serves to support the chassis, a portion of which is shown at B. Leaf springs Q are secured in the usual way by the clamps, pivots and shackles suggested at D, E and F.

A shock absorber embodying the principles of the present invention is indicated at S and is secured at its upper end s to the chassis B and at its lower end s' to the wheel or axle mounting A, D. It is thus clearly indicated that the shock absorber S is a true shock absorber and not a substitute for the spring support Q of the vehicle.

The shock absorber shown at 10 in Figure 2 is a highly simplified exemplary view of a shock absorber in which the upwardly disposed expansion or cavitation chamber and its valved partition which characterized earlier inventions by the present applicant (for example see my applications Ser. No. 22,836, filed April 23, 1948, now abandoned, and Ser. No. 145,788, filed February 23, 1950, now Patent 2,719,612, granted October 4, 1955), is done away with and the upper portion of the working chamber filled with air or a highly compressed gas G, the expanding power of which will prevent any cavitation, that is to say, the setting up of vacuum pockets in the portion of the cylinder located under the piston. The piston P of this shock absorber is shown diagrammatically as following the principles of construction of my earlier developments and is of the laminar type in which very thin clearance spaces 11 are provided between the greater effective side wall portion of the piston and the wall of the cylinder, perforated guiding and centering rings 12 and 13 being provided at one or both ends of the piston. The piston may be provided with valves 15 and 16 or not in accordance with the preferred use of the arrangement. This laminar piston has been disclosed in my French Patents 936,178 and 948,067 and certain Certificates of Addition based thereon, and also in my abandoned application Ser. No. 22,836 and my Patent 2,719,612. The liquid operating fluid in the shock absorber is indicated at H and the piston rod $t$ passes through an opening in the lower wall of the cylinder, this opening being packed in any suitable way such as by means of the oil pockets or rubber gaskets or washers $j$.

In order to protect the exposed portion of the piston rod $t$ there is provided an expansible and contractible accordion-like sleeve $a$ made of rubber or similar material. A lower centering washer K may be provided, this washer adapted to slide along the rod $t$ and interfit in certain of the convolutions of the protecting sleeve. At intervals along the sleeve there may be provided wire rings such as shown at $a'$ so as to give more steadiness and more lateral stiffness to the central portion of the accordion-like sleeve, without interfering with its free longitudinal movement. The upper end of the bellows may be snapped over the flange K' carried by the lower end of the shock absorber cylinder.

The device 25 shown in Figure 3 comprises a cylinder C containing an apertured piston P which is immersed in a liquid L which is maintained under pressure by a gas G. The rod T of the piston passes through the base of the cylinder, a tight joint being ensured by means of a sealing joint formed by an annular disc of rubber M which is compressed directly between the rod T and the cylinder C and maintained in place by two circular metallic washers 30 and 31 which are themselves held by two split metallic rings 32 and 33 (see also Figure 6) each formed by a spring wire curved to the radius of the cylinder C and housed in grooves of semi-circular cross-section formed in the internal wall of the cylinder. In order to ensure that the rings 32 and 33 are properly maintained in the grooves in the cylinder, the washers 30 and 31 are bevelled where they make contact with the rings as shown in Figure 1. That detail is of particular importance in connection with the external ring 31 which has to resist substantial forces because of the permanent internal pressure and because of the operation of the shock absorber.

A sealing joint formed in that manner is easily removed and renewed simply by changing the rubber part which forms the seal, while at the same time recharging the device with oil and gas. That is of particular technical and commercial interest. On the other hand, the joint is particularly suitable for ensuring gas tightness of a telescopic shock absorber having a permanent internal pressure while being very simple and cheap. Accordingly, such a sealing joint which is removable because of the use of a simple open metallic ring inserted into a groove formed in the internal wall of the cylinder, is also a feature of the present invention. This problem of recharging of shock absorbers is of very great importance and, of course, the recharging of shock absorbers by the method forming the principal object of the present application is also a feature of the invention.

Suspension shock absorbers are devices which are used in such large numbers and in particular by motorists that even the smallest technical advance in their conception or the slightest reduction in their cost of manufacture is of considerable economic and commercial interest.

The fluid tightness of the device which, having regard to the permanent internal pressure which is added to the intermittent measure resulting from the operation of the shock absorber, has to be very particularly studied, can be improved still further by the following improvements which afford the maximum protection for the piston rod and which, therefore, also form a feature of the invention.

The rod is protected against mud and other foreign substances by a bellows 50 of rubber or analogous material preferably pleated and of conical shape as shown in Figure 3, the essential and novel characteristic of the bellows being that its lower end is capable of sliding with a certain amount of play on the piston rod of the shock absorber as at 51 and, therefore, is not connected to that rod. It is already known that the rods of shock absorbers can be protected by pleated bellows analogous to that shown at 55 in Figure 8, but the known bellows have always been connected to the end of the piston rod as at 56 in Figure 8.

Relatively to that old system the new bellows system proposed here has three particular advantages.

In the old system, as the bellows is connected to the piston rod, it follows each of the movements of the latter; consequently, the rubber is subjected to fatigue and rapid deterioration. In the new system, on the contrary, the bellows which is shorter and hangs freely along the rod, does not follow all the normal movements of the rod and, therefore, the sliding bellows is much more durable. It can, therefore, be made of a less resistant rubber and as, moreover, it is also necessarily shorter and, therefore, requires less material for its construction, particularly when the conical form shown in Figure 3 is used, its manufacturing cost is much lower—of the order of one-half of the manufacturing cost of the conventional bellows—which represents a considerable economy.

Finally, contrary to expectations it is noted, rather surprisingly, that the protection given by the sliding bellows is much superior to that given by the older type of bellows. At first sight, the conventional bellows would appear to give perfect protection to the whole of the rod but that protection is to some extent illusory.

The movement of the end of the conventional bellows indeed results in such variation of the volume of air contained within the bellows that it is necessary to provide holes in the bellows in order to protect the rubber against stress and strain to which it could not be subjected without giving rise to extremely rapid deterioration. Consequently, during the operation of the shock absorber, somewhat violent alternating blasts of air occur between the interior and the exterior of the bellows, which cause the dust and mud particles, which occur in abundance beneath the car and are harmful to the life of the sealing joint, to be introduced into the bellows and on to the rod.

In the new system, on the contrary, as long as the movements are of moderate amplitude, there can obviously be no deformation of the bellows and, therefore, no gas flow which could entrain within the protecting bellows the dust and mud particles which are harmful to the effectiveness of the seal. Now, in a motor car suspension shock absorber, the great majority of the movements of the rod are movements of small amplitude. Those movements affect only a small part of the piston rod about midway along its length so that the rod is perfectly protected by the new type of protecting bellows.

In fact, the fact that the end of the rod is not protected by the bellows is not very harmful to the sealing joint because that end comes into contact with the joint only exceptionally. It is better to provide perfect but limited protection of the useful part of the rod than an imperfect and illusory protection of the whole of the rod. Experience shows that this new type of bellows which, moreover, is more economical, is, technically, much superior to the old form and ensures a longer life for the shock absorber.

In order to obtain a perfect seal, the tube is preferably welded at the end remote from the sealing joint.

However, the preferred form of construction is that shown in Figures 3 and 7, the end of the tube being mechanically pressed as at N in Figure 7 so as to reduce the size of the upper opening which is to be obturated, which allows that orifice to be obturated directly by welding the fixing rod $f$ and thus to reduce the amount of parts which have to be used. In order to facilitate that pressing operation and to avoid excessive thickening resulting from the reduction in diameter of the pressed part, the end of the tube may be preliminarily thinned down by a conical machining as shown at R in Figure 7.

The piston may be of the kind producing lamination of the oil between the piston and cylinder in accordance with abandoned application Serial No. 22,836 but preferably it will be a piston having valves which open progressively, the valves being formed of blades of thin spring metal or of a pile of blades of thin metal disposed flat on the two faces of the piston in accordance with my U. S. application Serial No. 230,944, now Patent 2,748,898, granted June 5, 1956, and as shown at V and V' in Figure 3 of the present application, the valves V controlling the rebound passageways W and the valve V' controlling the compression passageways (not shown) ordinarily displaced 90° from the passageways W. The present inventor has established that such a piston using such progressively opening valves gives better results with this kind of device functioning either in a liquid medium or a mixed liquid and gaseous medium.

If desired, and in order to reduce the production of emulsion or foaming, a float may be provided which partially separates the liquid and the gas and which is formed, for example, by a flat washer of cork or of any other light substance such as sponge rubber, etc. Such a device is particularly useful when what is being sought is not particularly a high degree of comfort for which total emulsion is desirable, but road holding qualities, for which it is advantageous to reduce the elasticity of the fluid which is used for the operation of the device as is, for example, the case in racing cars.

In Figures 4 and 5 of the drawings there is illustrated a modification which is applicable to the upper end of the shock absorber, and for convenience has been shown in connection with the embodiment illustrated in Figure 3 of the drawings. Within the upper end of the chamber formed by the cylinder C and just below the surface 60 of the liquid medium L where it contacts the gaseous medium G, there is provided a fixed partition Y which is provided with a multiplicity of orifices or perforations 61. This partition is in the nature of a strainer or sieve and may be made of metal, wire or a lattice work if desired. This sieve-like partition serves to cut down emulsion and foaming and has the effect of producing broken or interrupted jets, thus breaking up the mixture of oil and air.

It is understood that various changes and modifications may be made in the embodiments illustrated and described herein without departing from the scope of the invention as illustrated in the following claims.

Having thus described the invention, what is claimed as new and desired to be secured by Letters Patent is:

1. In a wheel suspension for vehicles, which includes suspension springs means for supporting the chassis of the vehicle upon the wheel mounting, a shock absorber of the direct acting telescoping type adapted to damp and cushion the relative movements of the chassis and wheel mounting without contributing in any substantial way to the support of the chassis: said shock absorber comprising, in combination, a cylindrical casing enclosing a cylindrical chamber and having a sealed closed upper end, means securing said cylinder to said chassis; a piston disposed for reciprocation in said chamber, a piston rod having its upper end fixed to said piston and extending from the piston downwardly through a packed opening in the lower end of the casing, means for securing the remote end of the piston to said wheel mounting; a liquid damping medium within said chamber but not completely filling it, the level of liquid being spaced below said sealed upper end, the piston adapted to move in said damping liquid and dividing said chamber into two portions of reciprocally variable capacity, by-passing means in conjunction with said piston for the passage of liquid from one of said chambers to the other as the piston reciprocates upon the occurrence of relative movement of said member, the entry of successive increments of the piston rod causing displacement of a corresponding volume of liquid damping fluid and thus raising the liquid level upon the occurrence of the compression stroke, and the withdrawal of the rod upon the rebound stroke having the opposite effect, a quantity of gaseous fluid occupying the space in the upper end of said chamber above the level of the working liquid damping medium, said gaseous fluid being under super-atmospheric pressure at all times whether or not the shock absorber is idle or under compression or rebound stroke and means provided in the immediate vicinity of the boundary surface between the working liquid and the high pressure gaseous body at the top of the chamber for minimizing foaming, said means comprising a relatively thin partition plate fixed at its margins to the walls of the cylinder in which the piston moves, at a point where it will lie but slightly below the minimum level of the liquid, said partition provided with a multiplicity of fine openings.

2. In a wheel suspension for vehicles, which includes suspension spring means for supporting the chassis of the vehicle upon the wheel mounting, a shock absorber of the direct acting telescoping type adapted to damp and cushion the relative movements of the chassis and wheel mounting without contributing in any substantial way to the support of the chassis: said shock absorber comprising, in combination, a cylindrical casing enclosing a cylindrical chamber and having a sealed upper end, means securing said cylinder to said chassis; a piston disposed for reciprocation in said chamber, a slender piston rod of the conventional small diameter relative to the diameter of the cylinder, which characterizes this class of shock absorber as opposed to fluid suspension devices, means connecting the upper end of said piston rod to said piston, means connecting the lower end of said rod to said wheel mounting, said rod passing through a packed opening in the lower end of said casing; a liquid damping medium within the lower portion of said chamber but not completely filling it, the level of liquid being spaced below said sealed upper end, the piston adapted to move in said damping liquid and dividing said chamber into two portions of reciprocally variable capacity, by-passing means in conjunction with said piston for the passage of liquid from one of said chambers to the other as the piston reciprocates upon the occurrence of relative movement of said member, the entry of successive increments of the piston rod causing displacement of a corresponding volume of liquid damping fluid and thus raising the liquid level upon the occurrence of the compression stroke, and the withdrawal of the rod upon the rebound stroke having the opposite effect; the means for packing the piston rod and sealing the opening in the lower end of the cylinder comprising two plates spaced apart axially of the cylinder and snugly enclosing between them a flat sealing disc, the plates and disc constituting the bottom wall of the cylinder, each plate provided centrally with an opening through which the piston rod may slide, the elastic sealing discs being compressed radially so as to bear with sealing effect against both the piston rod and the inner wall of the cylinder, annular grooves formed at axially spaced points in the inner wall of the cylinder and resilient split locking rings snapped into said grooves and against the edges of said plates to secure the packing and sealing assembly in place.

3. In a wheel suspension for vehicles, which includes suspension spring means for supporting the chassis of the vehicle upon the wheel mounting, a shock absorber of the direct acting telescoping type adapted to damp and cushion the relative movements of the chassis and wheel mounting without contributing in any substantial way to the support of the chassis: said shock absorber comprising, in combination, a cylindrical casing enclosing a cylindrical chamber and having a sealed upper end, means securing said cylinder to said chassis; a piston disposed for reciprocation in said chamber, a slender piston rod of the conventional small diameter relative to the diameter of the cylinder, which characterizes this class of shock absorber as opposed to fluid suspension devices, means connecting the upper end of said piston rod to said piston, means connecting the lower end of said rod to said wheel mounting, said rod passing through a packed opening in the lower end of said casing; a liquid damping medium within the lower portion of said chamber but not completely filling it, the level of liquid being spaced below said sealed upper end, the piston adapted to move in said damping liquid and dividing said chamber into two portions of reciprocally variable capacity, by-passing means in conjunction with said piston for the passage of liquid from one of said chambers to the other as the piston reciprocates upon the occurrence of relative movement of said member, the entry of successive increments of the piston rod causing displacement of a corresponding volume of liquid damping fluid and thus raising the liquid level upon the occurrence of the compression stroke, and the withdrawal of the rod upon the rebound stroke having the opposite effect; the means for packing the piston rod and sealing the opening in the lower end of the cylinder comprising two rigid plates spaced apart axially of the cylinder and snugly enclosing between them a flat elastic sealing disc, the plates and disc constituting the bottom wall of the cylinder, each plate provided centrally with an opening through which the piston rod may slide, the elastic sealing discs being compressed radially so as to bear with sealing effect against both the piston rod and the inner wall of the cylinder, the margins of the outward surfaces of said plates being bevelled off, annular grooves formed at axially spaced points in the inner wall of the cylinder, and resilient split locking rings snapped into said respective grooves and against the bevelled edges of said plates to secure the packing and sealing assembly in place.

4. In a telescoping direct acting shock absorber of the class described which comprises a substantially vertically disposed cylinder containing damping fluid, and a piston movable in said cylinder and having a piston rod of considerably less diameter than that of said cylinder passing through a packed opening in the lower end of the cylinder; a protecting tubular sleeve for the variably extending portion of the piston rod, one end of said tubular sleeve fitted about and secured to the lower end of the cylinder through which the rod extends, the other end of said tubular sleeve being of a diameter somewhat larger than the diameter of the piston rod, whereby the rod may pass freely through the depending lower end of the sleeve with a certain amount of clearance, said sleeve being a conical pleated bellows, the larger end secured to the shock absorber cylinder, the smaller end freely surrounding the piston rod, the sleeve being capable of axial contraction upon compression movement of the piston rod beyond a certain point, but for the most part adapted to surround and protect the major upper portion of the rod which comes into reciprocating contact with the packing in the opening of the cylinder.

References Cited in the file of this patent

UNITED STATES PATENTS

| | | |
|---|---|---|
| 2,064,527 | Ericsson | Dec. 15, 1936 |
| 2,156,117 | Johnson | Apr. 25, 1939 |
| 2,323,204 | Cross | June 29, 1943 |
| 2,357,505 | Crispell | Sept. 5, 1944 |
| 2,367,977 | Thornhill | Jan. 23, 1945 |
| 2,378,046 | Stergis | June 12, 1945 |
| 2,439,349 | Tack et al. | Apr. 6, 1948 |
| 2,523,714 | Nilsson | Sept. 26, 1950 |

FOREIGN PATENTS

| | | |
|---|---|---|
| 556,903 | Great Britain | Oct. 27, 1943 |